Dec. 29, 1953 P. Y. HINKLEY 2,664,120
SAW CHAIN
Filed Sept. 13, 1948 2 Sheets-Sheet 1
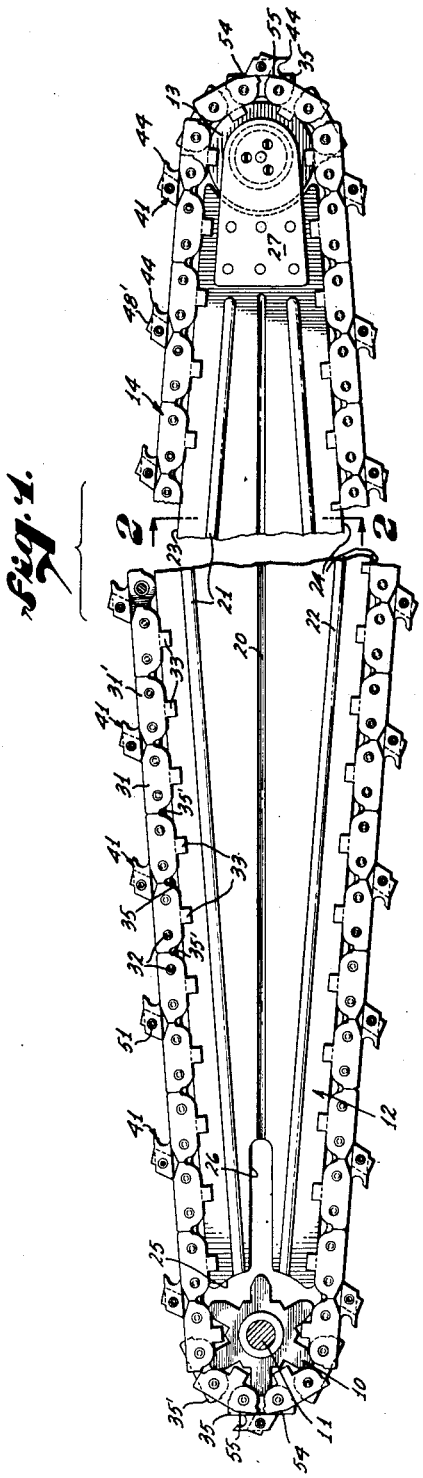
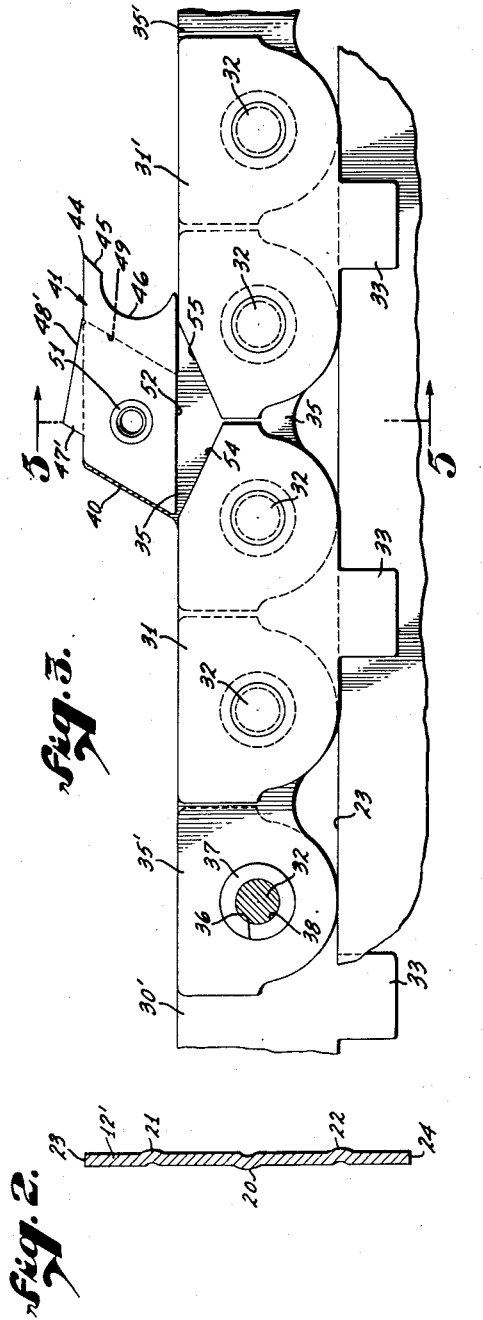
INVENTOR:
PAUL Y. HINKLEY
BY
ATTORNEYS.

Dec. 29, 1953 P. Y. HINKLEY 2,664,120
SAW CHAIN
Filed Sept. 13, 1948 2 Sheets-Sheet 2
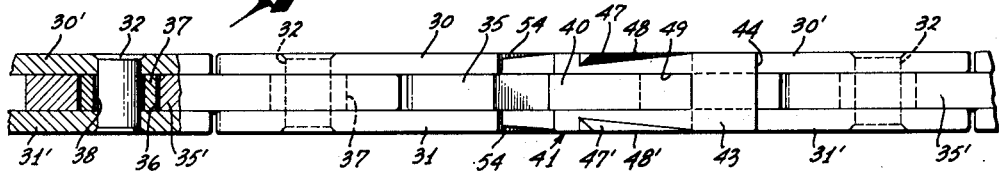
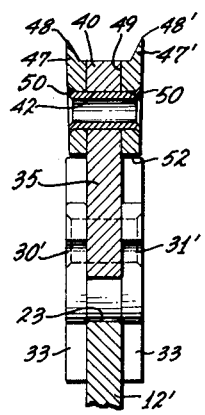
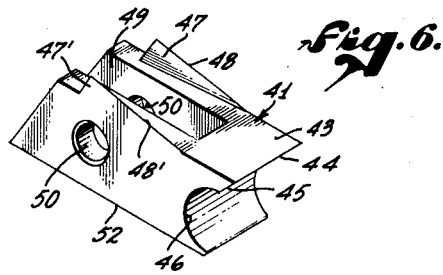
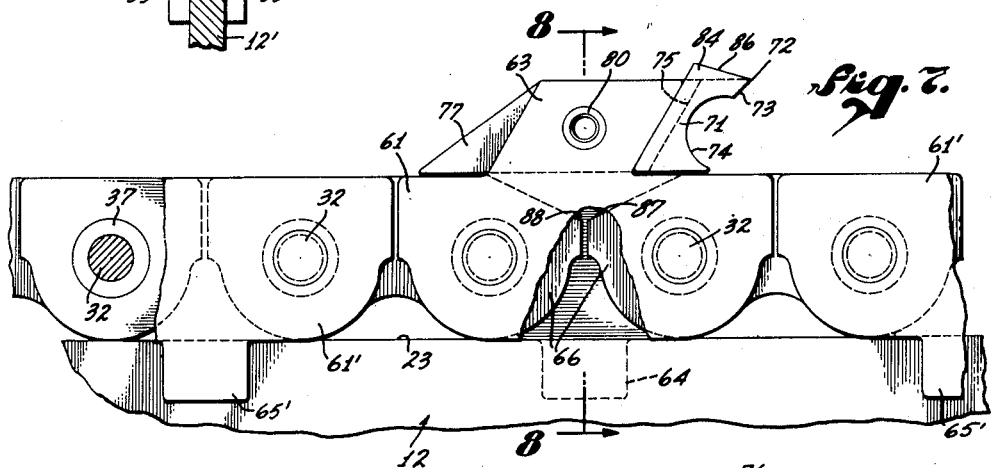
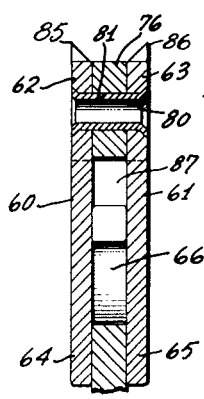
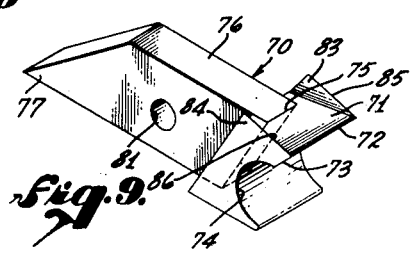
INVENTOR:
PAUL Y. HINKLEY
BY Huebner, Maltby
and Beehler
ATTORNEYS.

Patented Dec. 29, 1953

2,664,120

UNITED STATES PATENT OFFICE 2,664,120

SAW CHAIN

Paul Y. Hinkley, Los Angeles, Calif., assignor to
C & H Development Company, South Gate,
Calif., a partnership Application September 13, 1948, Serial No. 49,041

4 Claims. (Cl. 143—135)

The invention relates to chain saws which may more aptly be described as saws usually particularly large in size wherein the cutting teeth are carried by a chain traveling around a suitable support and which are widely used in the timbering industry for cutting down and sawing into lengths heavy timber.

When heavy timbers are to be cut, whether the timber chances to be green timber in the forest or large timbers on construction and other projects, if material of this kind is to be sawed with any degree of efficiency, saws must be capable of cutting a relatively wide kerf. Particularly under circumstances where the cuts must be made by hand rather than by use of bench saws or stationary saws considerable power is needed to drive the saw while making the cut. Prior to the advent of power-driven chain saws, sawing of this sort was accomplished by use of large cross cut saws adapted to be operated by a workman at each end of the saw. More recently there have been devised chain saws adapted to be operated by some form or other of power device. Such power devices have varied to the extent of using compressed air, gasoline-driven engines and electric motors. The chief advantage in power-driven chain saws has been their portability in that they can be carried into the field and used to cut heavy timber wherever that timber chances to be standing or stored. Heavy timber, and particularly that harvested in the Pacific Northwest, consists initially of trees so tall and heavy that only very specially designed equipment is capable of handling the logs before they are cut to convenient commercial lengths.

Although power operated chain saws have been devised and are in use in this industry, certain defects have been present which have impaired the efficiency of saws of this kind and have made expensive maintenance problems and particularly the problem of keeping a satisfactory sharp edge on the saw teeth. In most instances the chain saws heretofore used have been so constructed that the links of the chain constitute the saw teeth. Where such construction has been utilized damaging of any appreciable number of teeth or the dulling of the cutting edges on the teeth through normal use has necessitated replacing the entire chain while the damaged or dulled chain is being repaired or sharpened, or otherwise, permitting the device to stand idle until the chain could be properly re-conditioned. Extremely difficult sharpening problems have been experienced wherever it has been necessary to handle the entire chain in order to sharpen each individual saw tooth.

Other difficulties have also arisen in connection with chains heretofore employed in that they have been relatively heavy and bulky and difficult to assemble due to the fact that the teeth to be efficient must be of hardened steel and because of the teeth comprising an integral part of the link all of the links have therefore necessarily been made of hardened steel which has increased manufacturing and assembly costs. Construction of the kind described has further necessitated making chain saws of such width that considerable timber is wasted because of the excessive width of the kerf. In addition, relatively heavy carriers have been needed in order to provide a proper guide channel around which the chain is designed to travel in order to guide it properly through a cut.

It is therefore among the objects of the invention to provide a new and improved chain type saw wherein individual saw teeth can be removed for sharpening and replacement without the necessity of removing the chain from its assembled position in the device.

Another object is to provide a new and improved chain type saw adapted to utilize removable teeth of such construction that the teeth can be repeatedly removed, sharpened and replaced thereby prolonging to a great extent the life of the saw.

Another object of the invention is to provide a new and improved chain type saw which is particularly efficient in its operation in that the width of the chain saw is maintained at a relative minimum dimension and in that the links are so constructed that the chain is particularly resistant to being lifted from its position on a carrier under circumstances where the cutting edge encounters heavy resistance or obstruction during the cutting operation.

A further object of the invention is to provide a new and improved chain type saw so constructed that only the removable teeth need be made of hardened steel while the remaining portion of the chain structure may be made of steel having high tensile strength and other essential characteristics of steel utilized in a chain which permits of easy assembly and permits use of inexpensive materials without impairing the long life of the chain saw.

A still further object of the invention is to provide a new and improved chain saw device in which the breadth of the chain is maintained relatively narrow in dimension and in which a carrier is provided of relatively thick gauge sheet material but bearing configurations adapted to increase the strength sufficiently while at the same time preserving the entire assembly as one narrow in width so as to minimize the amount of waste in a cutting operation.

Still further among the objects of the invention is to provide a new and improved chain saw incorporating removable cutting teeth so constructed that the teeth when assembled on the chain assist in improving the rigidity of the chain in its travel around the carrier without in any way impairing the flexibility.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of an assembled chain saw device foreshortened for convenience in illustration.

Figure 2 is a cross-sectional view taken on the line 2—2 of Figure 1.

Figure 3 is an enlarged fragmentary side elevational view of one form of the chain.

Figure 4 is a top view partly in section of the form of chain illustrated in Figure 3.

Figure 5 is a fragmentary cross-sectional view taken on the line 5—5 of Figure 3.

Figure 6 is a perspective view of the removable saw tooth used in the form illustrated in Figure 3.

Figure 7 is an enlarged fragmentary side elevational view of another form of chain partially broken away to illustrate the structure.

Figure 8 is a cross-sectional view taken on the line 8—8 of Figure 7.

Figure 9 is a perspective view of the form of removable tooth illustrated in Figure 7.

In the manufacture of chain saws for use in heavy industry certain factors require considerable attention. In the first place these chain saw devices, although being made rugged and capable of being operated under considerable power, must, nevertheless, be light enough so that they can be readily carried about by workmen in the field. To this end it is advisable to make the chain as light in weight as possible commensurate with the needed requirement for strength and durability in use. The lightness requirement applies not only to the chain but also to a carrier adapted to support the chain in operation. Another highly important feature is the sharpening of the saw teeth. Skilled mechanics are not always available and it is also frequently inadvisable to locate maintenance shops in every location where chain saws might be in use. Since these devices are frequently operated under adverse conditions and continuously for long periods of time, it is extremely advantageous to provide removable teeth of the kind herein described which can be taken out of the chain saw and returned individually to some central maintenance depot for sharpening and reconditioning during which time other teeth can be inserted into the device in the field and thereby maintain it continuously in efficient operation. These problems among others influence the new and improved chain saw design here described in detail.

In the embodiment chosen to illustrate the device there is shown a cutting portion of a chain saw device complete with a drive sprocket 10 mounted upon a shaft 11, a carrier 12, an idler sprocket 13 and a chain saw indicated generally by the reference character 14. The drive shaft may be driven by some conventional means well known to those skilled in the art but which has not been illustrated in the present application.

The form of the carrier 12 in cross section is most readily apparent from an examination of Figure 2. The carrier consists of a plate 12' of relatively narrow gauge which is provided with a central longitudinal bead 20 extending outwardly from one face of the blade and longitudinal beads 21 and 22 extending outwardly from the other face of the blade, the last named beads being located nearer the respective edges 23 and 24. At the left end of the carrier as viewed in Figure 1 there may be provided an arcuate recess 25 adapted to permit rotation of the sprocket 10 and a somewhat elongated recess 26 in line with the bead 20. At the right-hand end of the carrier as illustrated in Figure 1 there may be provided a pair of plates 27 adapted to carry the sprocket 13, the sprocket being of such diameter that it provides an uninterrupted curved path from one edge 23 to the other edge 24.

The chain in this form consists of link members riveted one to another much in the same manner as the links of an ordinary flat endless chain. The chain is adjusted as to length so that it conforms to the combination of the carrier 12 and the sprockets 10 and 13. Conventional adjusting means may be provided if need be for maintaining a slight tension on the chain.

As illustrated, the link members are of two forms, one set of link members comprising double plate members and another set comprising single plate members, the double plate members being alternated with the single plate members. Specifically the double plate members comprise identical parallel plate elements 30 and 31 for one member and elements 30' and 31' for the next adjacent member, each of these being provided with suitable apertures for reception of rivets 32. At the lower or inner side of each of the plate elements 30, 31, 30' and 31' are drive lugs 33 which are adapted to be engaged by the teeth of the drive sprocket 10. The drive lugs also serve to guide the link around the carrier by reason of the fact that the lugs are spaced apart a distance very slightly greater than the gauge of the carrier so that the lugs are adapted to freely slide around the outer edge of the carrier.

Interfitting with the double plate members are members of a set of single plate members, these members comprising individual links 35 and 35', alternating with each other, preferably somewhat thicker in gauge than the plate elements 30 and 31 in order to more nearly equalize the tensile strength of the single plate members and the double plate members. At the ends of the links 35 and 35' are apertures 36 adapted to receive sleeves 37 with a clearance such that the sleeves are capable of freely rotating within the apertures 36. Sleeves 37 may be of somewhat soft material such as aluminum or wrought iron, whereas the rivets 32 are preferably made relatively harder and tougher. Apertures 38 of the sleeves provide a free sliding fit for the rivets 32. With this construction flexibility of movement between the single link members and double link members is preserved.

The form of the single link members can be determined by the dotted lines of Figure 3 and it will be observed that the ends are somewhat rounded in order to facilitate engagement of the link members with the sprocket teeth and also to permit the plate elements to rotate freely one with respect to another. Alternate links 35 differ from the links 35' to the extent that the links 35 include outwardly extending anchor lugs 40 having substantially the same gauge as the link itself and if preferred pitched forwardly with respect to the direction of travel of the chain. In other respects the links 35 resemble the links 35'. The anchor lugs are for the purpose of attaching the movable saw teeth 41 upon the chain and for this purpose are provided with transverse apertures 42.

The removable link adapted for use with the form of the invention described in connection with Figures 1 through 5, inclusive, is best illustrated in Figure 6. As there shown the removable link comprises a block of case hardened steel having a relatively flat outer surface 43 terminating at its forward end in a transverse cutting edge 44. Beneath the cutting edge is a beveled undercut portion 45 and lying adjacent the undercut portion is an arcuate relief 46.

Located rearwardly of the cutting edge is a pair of rake cutters 47, 47' located one on each side of the tooth. The rake cutters include forward sloping and sharpened edges 48, 48'. At the rear of the tooth there is provided a channel 49 having such breadth as to permit the tooth to be slid over the anchor lug 40 previously described. When so positioned, apertures 50 on opposite sides of the tooth are adapted to coincide with the aperture 42 of the anchor lug so that a sleeve rivet 51, preferably of relatively soft material, may be utilized to firmly anchor the removable tooth in place on the link 35. The rivet, being soft, is capable of relatively easy removal by a suitable tool but is nevertheless sufficiently strong to hold the tooth fixed in position during all cutting operations. The thrust upon the tooth is absorbed by the anchor lug so that the sleeve rivet need not be depended upon to absorb the thrust.

Because of the fact that a lower edge 52 of the removable tooth extends for a substantial distance along the top of the chain the presence of this edge on each side will obstruct flexure of the links 30 and 31, 30' and 31' when the chain travels around the ends of the carrier. In order to permit free flexure of the plate elements of the double link members, the plates 31 are provided with beveled ends 54 and the plates 31' with beveled ends 55 wherein the bevel extends at an angle sufficient to permit movement of the plates at the ends of the carrier without abutment of the beveled portions against the lower edges 52 of the removable tooth.

By utilization of a chain of the type described, removable saw teeth may be mounted upon special anchor lugs provided for them on the chain and the chain mounted upon the carrier 12. In mounted position the drive lugs 33 ride along on opposite sides of the outer edges of the carrier and guide the chain throughout its path of travel. The drive lugs also engage the teeth of the sprockets at the ends of the carrier. Moreover, by reason of placing the ends of the plate elements in relatively close position one with respect to another so that flat faces lie in close relationship, any tendency to lift upwardly at the transverse cutting edge of the tooth has a tendency to lift the entire chain from its position on the carrier, and because of the resistance of the entire chain to being lifted the striking of a hard section with a tooth does not result in pulling the chain loose from its position on the carrier to any measurable extent.

Although hard rivets may be used to connect together the set of single link members with the set of double link members in alternate arrangement this does not interfere with the efficiency of maintaining the chain in good working condition. The sleeve rivets 51, owing to the fact that they need be made only of soft metal, permit ready removal of the rivets and consequent ready removal of the removable teeth which removal can be accomplished by driving a steel pin against the sleeve rivets from one side or by pressing the rivet out of place with some convenient tool. Any number or all of the teeth may be quickly removed from the chain and new sharp teeth replaced upon the chain and there held in place by action of a relatively soft sleeve rivet or other comparable soft rivet. The teeth thus removed can then be sent separately to a maintenance depot and there sharpened. The shape of the teeth illustrated in Figure 6 permits of many repeated sharpenings either by grinding against the beveled undercut 45 or grinding to some extent upon the flat surface 43 when that turns out to be necessary for truing up the edge.

The rake cutters 47, 47' may also be reconditioned by grinding on the inside faces in order to sharpen the cutting edges 48, 48'. After the teeth have been properly reconditioned, they may be re-inserted in the chain with the same ease that new teeth may be applied thereto.

The construction above described further makes possible the use of a chain relatively small in overall thickness and the removable tooth can be made as thin as is necessary in order to accommodate itself to a chain of given thickness. This results in the ability to build a chain saw the overall thickness of which is not great and which produces appreciable economies in cutting operations by holding the kerf to a minimum width. Moreover, by making the double link members with drive lugs 33 sliding on the outside faces of the carrier, the carrier may be constructed of relatively thin gauge material, thereby greatly lightening the weight of the device and eliminating costly milling operations as was previously necessary when carriers were grooved for guiding the chain. Though light in weight, use of longitudinal beading preserves sufficient strength and rigidity in the carrier for all purposes.

In a second form of the device illustrated in Figures 7, 8 and 9 the structural principles already discussed have been adhered to but in this second form the removable teeth are adapted to be carried by the double link members rather than by the single link members.

To this end plate elements 60, 61 are provided respectively with upwardly or outwardly extending anchor lugs 62, 63 providing a channel or space therebetween. These anchor lugs may, if preferred, be pitched in a forward direction with respect to chain travel. On the opposite sides of the plate elements there are provided drive lugs 64 and 65 which are adapted to slide along opposite faces of the carrier 12 and which are also adapted to be engaged by the teeth of the sprockets. The double link members comprising the plate elements 60 and 61' are preferably alternated with double link members wherein plate elements 61' are visible in Figure 7. These plate elements 60 and 61 include anchor lugs 62 and 63 which are similar to and serve the same purpose as the anchor lugs 40 previously described.

On the plate elements illustrated by that bearing reference character 40 the anchor lugs have been omitted so that the cutting teeth are carried only by every other one of the double link members.

To utilize the arrangement of anchor lugs illustrated in Figures 7 and 8, a cutting tooth 70 is provided having the form illustrated in Figure 9. In this form of tooth there is a hardened end 71 including a transverse cutting edge 72, a beveled undercut 73 and an arcuate relief 74. At the rear of the tooth portion bearing the cutting edge there may be provided a channel 75 in which the adjacent end of a tongue 76 may be adapted to be received and there brazed or otherwise secured in place. The aim is to have the hardened end 71 and the tongue 76 act together as a single integral unit. The tongue includes an end portion 77 adapted to overlie a considerable length of a single plate element 66 located as a connecting means between the double plate members identified by the plate elements 61, 61' at the rear of the tooth. This overlying relationship of the tongue adds to the rigidity of the chain and resistance to lifting of the chain from the carrier when the tooth hits a hard area or obstruction.

The tongue is retained upon the anchor lugs by a soft sleeve rivet 80 similar to the rivet 51 except that in this instance the central portion of the rivet lies within an aperture 81 in the tongue 77 and extends through corresponding apertures in the anchor lugs 62, 63.

In other respects the chain and the joining of successive link members of the chain resemble in detail the chain and the joining thereof as described in connection with the form illustrated in Figures 1 through 5, inclusive.

In this last described form of removable tooth there are provided rake cutters 83, 84 on which are sharp forward cutting edges 85, 86. In this instance the rake cutters are somewhat shorter than those described in connection with Figure 6 but extend the full length of what may be termed the cutting head of the removable tooth. A further economy may be effected in the design of teeth last described in that only the so-called cutting head of the tooth need be made of hardened steel, whereas the tongue may be made satisfactorily of a somewhat softer material without in any way impairing the efficiency of a cutting operation.

Here again plate elements of the link members need to be beveled to permit proper flexure of the links around the sprockets. In this instance, however, a bevel 87 is made at one end of the single link element on the forward side of the removable tooth and a bevel 88 is made on the forward end of a single link member at the rear of the tooth. The means of attaching the set of single link members to the set of double link members is the same as that described in connection with the form of the invention first referred to.

By providing a structure of the type heretofore described in detail very material economies are effected in the fabrication of chain saws. The chains may be made independently, of steel or other material best suited to provide necessary tensile strength, ruggedness and rigidity contributing to the provision of a chain of relatively narrow thickness. Removable blades of any desired hardness far exceeding the hardness of the chain itself may be utilized to material advantage, thus providing a long wearing accurate cutting edge for all cutting operations. The teeth may be removed at will for reconditioning and sharpening by grinding operations without disturbing the mounting of the chain upon the carrier. Successful grinding can be easily achieved without any heat treatment of the removable teeth being made necessary. As soon as they are ground the removable teeth are ready for replacement on the chain. The chain saw thus provided is adapted to cut a kerf of minimum breadth in heavy timber while the chain saw, without sacrifice of ruggedness or qualities permitting long wear in the field, is made sufficiently light in weight so that it can be handled with ease by a single operator in the field.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A chain saw comprising a series of link members riveted one to another adapted to flex in a plane transverse to the plane of the axes of the rivets, said link members comprising a set of double plate members and a set of single plate members confined between adjoining double plate members, the members of one set alternating with members of the other set, anchor lugs on the members of one of said sets extending outwardly and each anchor lug having a tooth-engaging face extending obliquely forwardly relative to the direction of travel and outwardly, the link member upon which each anchor lug is mounted having a forwardly extending tooth-receiving face at the base of the anchor lug parallel to the direction of travel of the link member, removable teeth each having a transverse forwardly extending cutting edge and a pair of side cutters integral therewith extending rearwardly of the cutting edge, an oblique rearwardly and inwardly extending face on each tooth complementary to and adapted to lie against the respective tooth-engaging face of the lug in position wherein the bottom of the tooth is positioned on the respective tooth-receiving face of said respective member, and a relatively soft non-load bearing transverse rivet connection between each tooth and the respective anchor lug.

2. A chain saw comprising a series of link members riveted one to another adapted to flex in a plane transverse to the plane of the axes of the rivets, said link members comprising a set of double plate members and a set of single plate members confined between adjoining double plate members, the members of one set alternating with members of the other set, anchor lugs on the members of one of said sets extending outwardly and each anchor lug having a tooth-engaging face extending obliquely forwardly relative to the direction of travel and outwardly, the link member upon which each anchor lug is mounted having a forwardly extending tooth-receiving face at the base of the anchor lug, removable teeth each having a transverse forwardly extending cutting edge and a pair of side cutters integral therewith extending rearwardly of the cutting edge, each said tooth having a rearwardly extending tongue supporting the side cutters and adapted to overlie an adjacent portion of the respective member and having parallel side faces thereof parallel to side faces of the anchor lug, an oblique rearwardly and inwardly extending face on each tooth complementary to and adapted to lie against the respective tooth-engaging face of the lug in position wherein the bottom of the tooth is positioned on the respective tooth-receiving face of said respective member, and a relatively soft non-load bearing transverse rivet connection between each tooth and the respective anchor lug.

3. A chain saw comprising a series of link members riveted one to another adapted to flex in a plane transverse to the axes of the rivets, said link members comprising a set of double plate members and a set of single plate members alternating with the set of double members, anchor lugs on the members of one of said sets having teeth-engaging faces extending obliquely forwardly and outwardly with respect to chain travel presenting a support for teeth transverse to the direction of chain travel, removable teeth each having a transverse forwardly extending cutting edge portion and a side cutter on each side of each tooth integral with and extending rearwardly from the transverse cutting edge portion, a shoulder on each tooth extending obliquely inwardly and rearwardly relative to the direction of chain travel and adapted to engage the tooth-contacting face of the respective anchor lug, removable separate transverse anchor means engaging each said tooth and anchor lug adapted to retain the respective tooth on the corresponding anchor lug, and tongue means on each tooth extending in a rearward direction parallel to and in lateral engagement with the respective anchor lug and said side cutters extending outwardly therefrom.

4. A chain saw comprising a series of link members riveted one to another adapted to flex in a plane transverse to the plane of the axes of the rivets, said link members comprising a set of double plate members and a set of single plate members confined between adjoining double plate members, the members of one set alternating with members of the other set, said single plate members having outwardly facing flat faces and outwardly and obliquely forwardly extending anchor lugs, and removable teeth having forwardly extending cutting edges, each said tooth having an inside flat area adapted to lie upon the flat face of the respective link and having an anchoring face adapted to extend obliquely toward the flat area and engage against the respective anchor lug, and a pair of laterally spaced tongues on each tooth extending from the cutting edge rearwardly and adapted to overlie the opposite sides of the anchor lug and to contain said anchor lug therebetween, each said tooth having a non-load bearing removable rivet attachment to the respective anchor lug.

PAUL Y. HINKLEY.

References Cited in the file of this patent

UNITED STATES PATENTS

| Number | Name | Date |
|---|---|---|
| 279,780 | Magaw | June 19, 1883 |
| 596,802 | Brown et al. | Jan. 4, 1898 |
| 873,666 | Gray et al. | Dec. 10, 1907 |
| 1,231,190 | Peterson | June 26, 1917 |
| 1,239,384 | Gisch | Sept. 4, 1917 |
| 1,349,557 | Boswell | Aug. 17, 1920 |
| 1,483,387 | Serin | Feb. 12, 1924 |
| 1,979,001 | Kankos | Oct. 30, 1934 |
| 2,326,854 | Hassler | Aug. 17, 1943 |
| 2,515,550 | Ciba | July 18, 1950 |

FOREIGN PATENTS

| Number | Country | Date |
|---|---|---|
| 241,110 | Great Britain | Oct. 15, 1925 |